United States Patent [19]

Norell et al.

[11] Patent Number: 4,978,517

[45] Date of Patent: Dec. 18, 1990

[54] PROCESS FOR THE PRODUCTION OF CHLORINE DIOXIDE

[75] Inventors: Maria Norell; Björn H. Svedin, both of Sundsvall, Sweden

[73] Assignee: Eka Nobel AB, Surte, Sweden

[21] Appl. No.: 316,879

[22] Filed: Feb. 28, 1989

[30] Foreign Application Priority Data

Oct. 25, 1988 [SE] Sweden .............................. 88038179

[51] Int. Cl.[5] .............................................. C01B 11/02

[52] U.S. Cl. .................................................... 423/479

[58] Field of Search ................ 423/479; 203/DIG. 23

[56] References Cited

U.S. PATENT DOCUMENTS

| | | | |
|---|---|---|---|
| 3,563,702 | 2/1971 | Partridge et al. | 423/478 |
| 3,864,456 | 2/1975 | Winfield et al. | 423/478 |
| 3,933,988 | 1/1976 | Rosen | 423/480 |
| 3,983,010 | 9/1976 | Rauch et al. | 203/99 |
| 4,081,520 | 3/1978 | Swindells et al. | 423/478 |
| 4,115,217 | 9/1978 | Larsson et al. | 423/479 |
| 4,145,401 | 3/1979 | Swindells et al. | 423/478 |
| 4,465,658 | 8/1984 | Fredette | 423/478 |
| 4,473,540 | 9/1984 | Fredette | 423/479 |
| 4,770,868 | 9/1988 | Norelle | 423/479 |

FOREIGN PATENT DOCUMENTS 0284577 9/1988 European Pat. Off. .

1471370 1/1967 France .

OTHER PUBLICATIONS

Applegate, L. E., *Membrane Separation Processes*, Chemical Engineering, vol. 91, No. 12, 6/11/84, p. 87.

*Primary Examiner*—Jeffrey E. Russel
*Assistant Examiner*—Brian M. Bolam
*Attorney, Agent, or Firm*—Burns, Doane, Swecker & Mathis

[57] ABSTRACT

A process for production of chlorine dioxide by reacting in a reaction vessel an alkali metal chlorate, a mineral acid and methanol as a reducing agent in proportions to generate chlorine dioxide in a reaction medium maintained at a temperature from about 50° C. to about 100° C. and at an acidity within the interval from about 2 to about 11N and subjected to an subatmospheric pressure. Thereby water is evaporated and a mixture of chorine dioxide, water vapor and gaseous by-products is withdrawn from an evaporation region in the reaction vessel. The alkali metal sulphate is precipitated in a crystallization region in the reaction vessel. The content of formic acid in the reaction vessel is increased by addition of formic acid to a content of formic acid exceeding about 0.3M. The gaseous by-products are condensed to obtain formic acid and the content of formic acid in the reaction vessel is increased by recirculation of the condensate.

7 Claims, 2 Drawing Sheets

Mol/h Produced formic acid
T= 70°C
2.0
1.0
0.5
1.0 (HCOOH) (M)

Mol/h Produced formic acid
T= 70°C 2.0
1.0
0.5
1.0
(HCOOH) (M)

1
5
A
4
R
7
3
6
2

$P_{ABS}$ = 0,132 bar
% Condensing
100
50
$H_2O$
HCOOH
Me OH
10
20
30
40
T °C

PROCESS FOR THE PRODUCTION OF CHLORINE DIOXIDE

BACKGROUND OF THE INVENTION

The present invention relates to a process for the production of chlorine dioxide from an alkali metal chlorate, a mineral acid and methanol as a reducing agent. The process is carried out in a vessel operated under subatmospheric pressure, whereby water is evaporated and withdrawn together with chlorine dioxide and the alkali metal salt of the mineral acid is crystallized within the reaction vessel and withdrawn therefrom. According to the invention the efficiency of the process is improved by increasing the content of formic acid in the reaction vessel by addition of formic acid.

Chlorine dioxide used as an aqueous solution is of considerable commercial interest, mainly in pulp bleaching but also in water purification, fat bleaching, removal of phenols from industrial wastes, etc. It is therefore desirable to provide processes by which chlorine dioxide can be efficiently produced.

The predominant chemical reaction involved in such processes is summarized by the formula $$ClO_3^- + Cl^- + 2H^+ \rightarrow ClO_2 + \tfrac{1}{2}Cl_2 + H_2O \quad [1]$$

The chlorate ions are provided by alkali metal chlorate, preferably sodium chlorate, the chloride ions by alkali metal chloride, preferably sodium chloride, or by hydrogen chloride, and the hydrogen ions by mineral acids, normally sulfuric acid and/or hydrochloric acid. Processes for producing chlorine dioxide are described in e.g. U.S. Pat. Nos. 3,563,702 and 3,864,456.

In existing processes for production of $ClO_2$ there is often also a by-product $Cl_2$ formation, due to the use of chloride ions as reducing agent according to formula [1]. This chlorine by-product has formerly been used as such in the paper mills as a bleaching agent in aqueous solution. Today there is a tendency towards a more extensive chlorine dioxide bleaching for environmental reasons and thus there is a decreasing need for chlorine as a bleaching agent.

It is also known to use other reducing agents, which do not produce chlorine as a by-product. In U.S. Pat. No. 3,933,988 sulfur dioxide is used as a reducing agent and in U.S. Pat. Nos. 4,081,520, 4,145,401, 4,465,658 and 4,473,540 methanol is used as reducing agent. The methanol is very poorly utilized in a process according to e.g. U.S. Pat. No. 4,465,658. The consumption of methanol is 190–200 kg/ton produced chlorine dioxide whereas the theoretical consumption is only 79 kg/ton according to the formula $$6NaClO_3 + CH_3OH + 4H_2SO_4 \rightarrow 6ClO_2 + CO_2 + 5H_2O + 2(Na_3H(SO_4)_2 \quad [2($$

Thus only about 40% of the methanol charged are used efficiently in existing processes. A thorough study of the reaction products from earlier known processes shows that parts of the added methanol leave the reactor without having reacted. This loss can be as high as 30 to 40 percent.

However, the direct reaction between chlorate ions and methanol is very slow and the true reducing agent in this case is chloride ions reacting according to [1]. The produced chlorine then reacts with methanol to regenerate chloride ions according to the formula $$CH_3OH + 3Cl_2 + H_2O \rightarrow 6Cl^- + CO_2 + 6H^+ \quad [1]$$

It is therefore often necessary to continuously add a small amount of chloride ions in order to obtain a steady production.

A more efficient process with methanol as a reducing agent is described in U.S. Pat. No. 4,770,868. According to this patent it appears that the methanol losses are strongly dependent on the mode of addition of the methanol to the reactor. According to the U.S. patent an improved yield is obtained by introducing the reducing agent in the crystalization zone of the reactor.

The U.S. Pat No. 4,770,868 shows a considerably improved process, but losses of methanol are still obtained as a result of by-reactions. The main by-reaction takes place according to the following net formula:

$$12NaClO_3 + 3CH_3OH + 8H_2SO_4 \rightarrow 12ClO_2 + 4Na_3H(SO_4)_2 + 3HCOOH + 9H_2O \quad [4]$$

The formed formic acid and the methanol which has not been consumed are by-products which only constitute losses in the system. According to known methods they are condensed together with formed water vapour and are added to the absorption tower for the chlorine dioxide absorption. The formic acid and the methanol which has not reacted are thus incorporated in the obtained chlorine dioxide water, which will give as a result that they after the chlorine on the waste water from the bleach plant. Another draw back with formic acid in the chlorine dioxide water is a reduced stability of the water. U.S. Pat. No. 4,770,868 suggests addition of small amounts of catalysts to influence the oxidation of methanol to carbon dioxide in a favourable way.

BRIEF DESCRIPTION OF THE DRAWINGS

For a full understanding of the invention, the following detailed description should be read in conjunction with the drawings, wherein.

DETAILED DESCRIPTION OF THE PREFERRED EMBODIMENTS

The present invention, as it appears from the claims, provides an improved process with a considerable reduction of the losses in the form of by-products, without the use of catalysts. According to the process of the invention formic acid is added to the reactor. As a result thereof a higher steady state concentration of formic acid is obtained in the reactor. Surprisingly this leads to an increased conversion of methanol to carbon dioxide according to the formulae 2 (and 3). Thereby the consumption of methanol is reduced as the conversion of methanol to formic acid according to the by-reaction 4 is reduced. Besides, a more pure chlorine dioxide is obtained.

Figure 1:
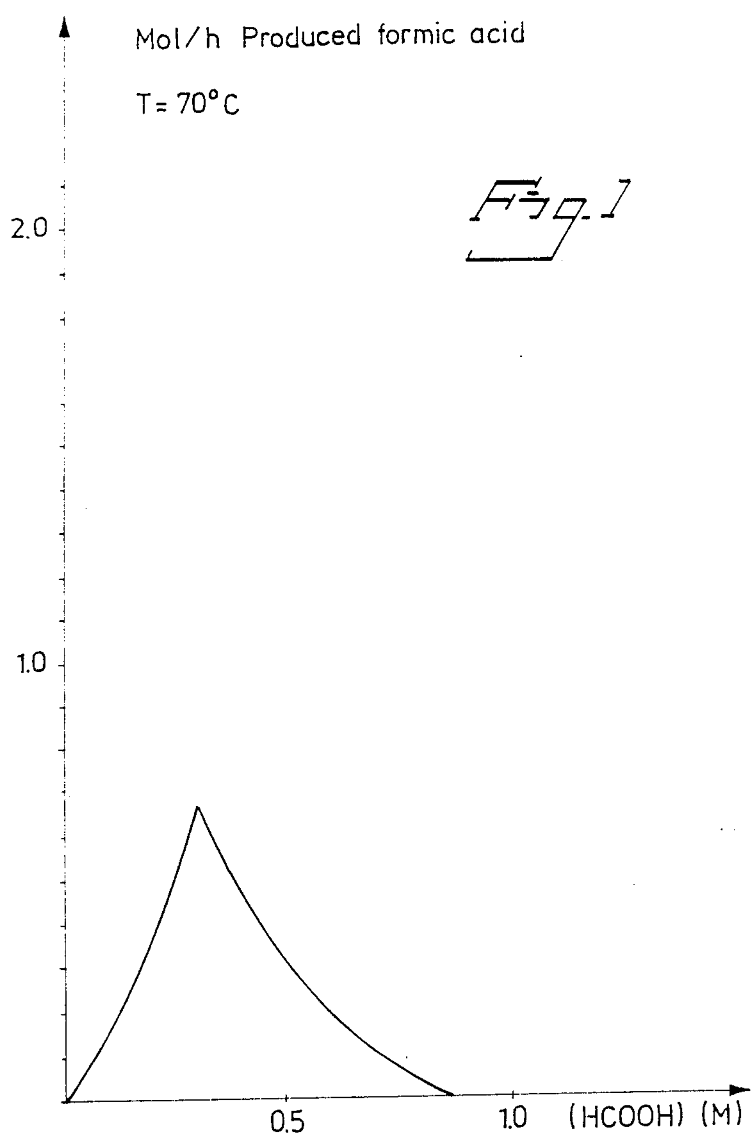
FIG. 1 is a graph of formic acid concentration vs. moles/hr. of produced formic acid.

A study of the relation between the content of formic acid in the reactor and the amount of formic acid leaving the reactor shows that the amount of formic acid leaving the reactor increases with increasing content of formic acid. However, from FIG. 1 it is evident that when the content in the reactor is increased above a certain concentration, the amount of produced formic acid will be strongly reduced. This fact indicates that the reaction producing formic acid is favoured at low concentrations, whereas at high concentrations the reaction consuming formic acid is favoured. By addition of formic acid to the reactor the concentration can be increased to the concentration range where the formic acid consuming reaction is dominating, whereby the conversion of methanol to carbon dioxide instead of to formic acid is increased.

The concentration of formic acid in the reactor should be above about 0.3 M, preferably above about 0.6 M. The upper limit for the concentration of formic acid depends on solubility and vapour pressure for the formic acid, i.e. it depends on the temperature at which the reactor is run. This temperature can easily be tried out. It has been found practical not to exceed 3.5 M.

The addition of formic acid to the reactor can be made in the same way as the other chemicals. The formic acid can also be added by recirculation of the condensed by-products to the chlorine dioxide reactor. The unconsumed methanol is then also brought back to chlorine dioxide production resulting in a reduced methanol consumption. By recirculation of the condensed by-products these are reused in a useful way instead of loading the waste water. Recirculation of the condensed by-products is a preferred way of adding formic acid to the reactor.

The process according to the invention is applied to those chlorine dioxide processes which are performed in one single reaction vessel, generator—evaporator—crystallizer, at a reduced pressure. At the process water is vaporized and withdrawn together with chlorine dioxide. The alkali metal salt of the mineral acid is crystallized and withdrawn from the reaction vessel. A suitable reactor is a SVP ® (single vessel process) reactor.

Figure 2:
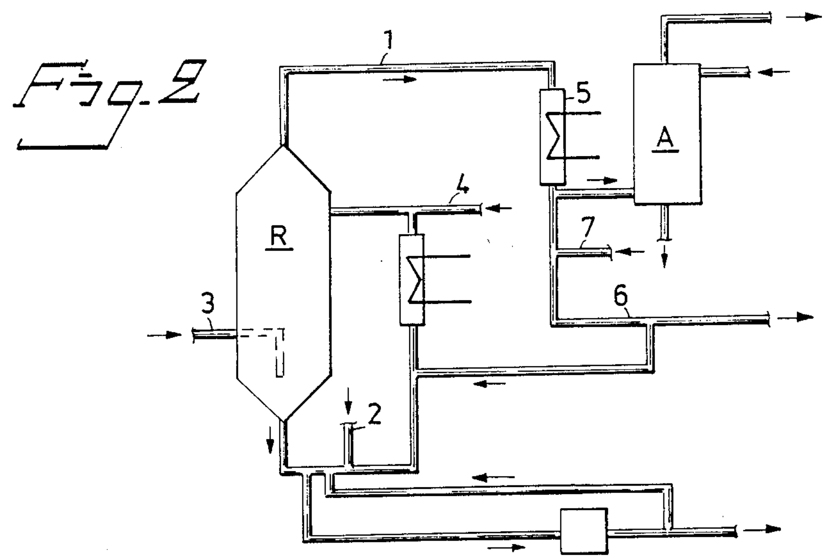
FIG. 2 is a schematic diagram of the process of the invention.
Figure 3:
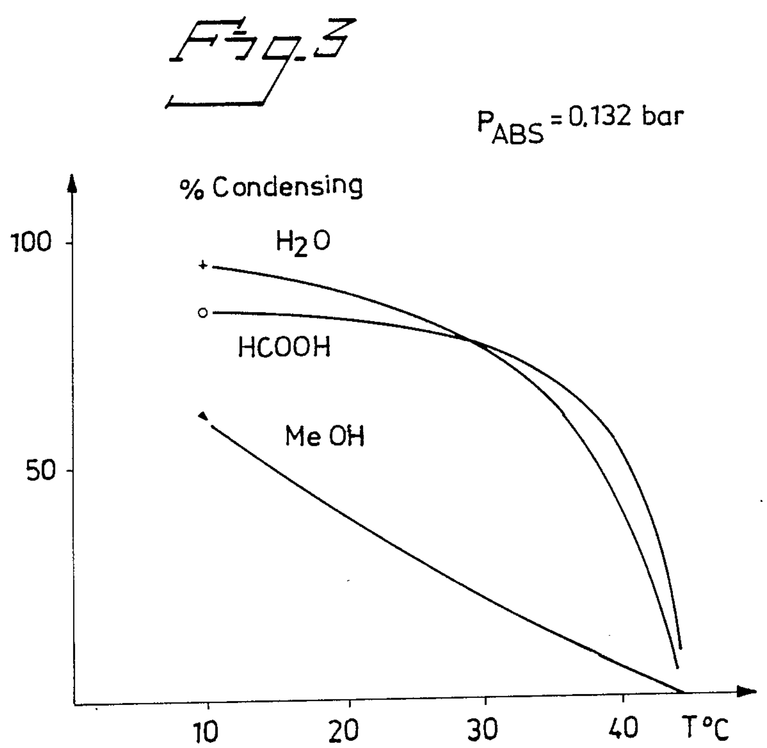
FIG. 3 is a graph of temperature vs. percentage condensation for water, methanol and formic acid.

The invention is illustrated by means of the flow chart in FIG. 2 and the diagram of the condensation in FIG. 3. Dissolved alkali metal chlorate 2, methanol 3 and mineral acid 4 are added to the reactor R. Reactor gas leaves the reactor via the conduit 1 and is brought to a condenser 5. The reactor gas consists mainly of formed chlorine dioxide, water vapour, carbon dioxide and the by-products and formic acid and unreacted methanol. The conditions in the condenser are regulated so that the water vapour, the formic acid and the methanol are condensed and withdrawn as a flow 6 to be brought back to the reactor. The chlorine dioxide gas is brought to an absorption tower A for the absorption of the chlorine dioxide in water. The temperature in the condenser should be between 8° and 40° C. at an absolute pressure of between 90 and 400 mm Hg, a preferred temperature interval is between 12° and 25° C. and a preferred pressure is between 110 and 250 mm Hg. From the diagram in FIG. 3 it is evident that at these conditions the main part of the formic acid will condense together with water and methanol. However, it is only a very small part of the chlorine dioxide that will condense, e.g. at 10° C. only about 0.8%. Further, to reduce the amount of condensed chlorine dioxide in the condensate air can be blown in at 7 in FIG. 2, whereby any condensed chlorine dioxide is desorbed.

The condensate of by-products can be brought back completely or partly to chlorine dioxide production. The condensate can be brought to the tank for chlorate dissolving and replace fresh water. The need for fresh water is then reduced, which can be an advantage when there is a problem with the purity of the fresh water. However, the recirculation of the formic acid results in an increased risk of corrosion as the chlorate solution becomes more acid. Therefore the condensate of by-products can suitably be concentrated and brought directly to the chlorine dioxide reactor or via the tank for methanol storage. Several different processes can be used for concentration, e.g. azeotropic distillation, adsorption or membrane separation as e.g. reverse osmosis and ultra filtration.

The amount of condensate being recirculated can be varied within wide limits, from a small amount of the condensate to 100% of it. The degree of recirculation for the condensate is decided from such parameters as the amount of water vapour that is desirable to bring back to the reactor, and if a step for concentration of the condensate has been used. If the condensate is concentrated a larger amount can be recirculated without bringing back too much water to the system.

The production of chlorine dioxide is carried out by continuous addition of the reactants to the reactor. The reaction is run at a temperature of 50°-100° C., preferably 50°-75° C. and at a subatmospheric pressure, suitably at 60-400 mm Hg. The acid strength can be kept within a wide interval, between 2 and 11 N. When the acid strength is kept between about 2 and 4.8 the reaction can be carried out in the presence of a small amount of catalyst, which can be one or a combination of two or more metals chosen from the group antimony, molybdenum, technetium, ruthenium, rhodium, palladium, rhenium, osmium, iridium, platinum, or a combination of one or several of these with manganese or vanadium. Sulphuric acid or hydrochloric acid or mixtures of these are mineral acids suitable to use, but other mineral acids can also be used. If hydrochloric acid is not used as a mineral acid in the process it can be suitable to add a smaller amount of chloride ions, preferably in the form of alkali metal chloride, so that the concentration of the chloride ions in the reactor is within the interval from 0.001 and up to 0.8 moles per liter. The process is not limited to one of the alkali metals, but sodium is the one most preferred.

The invention is illustrated by the following examples in which by parts and per cent are meant parts and per cent by weight if nothing else is said:

EXAMPLE 1

A chlorine dioxide reactor of the SVP type was run at boiling and 100 mm Hg and with additions of 320 g of $NaClO_3$/h, 5 g of NaCl/h and 196 g of $H_2SO_4$/h. A flow of 30 g/h of methanol was added. No recirculation of the condensate to the reactor took place. 202 g/h of $ClO_2$, 7.5 g/h of $CO_2$, 8.5 g/h of $CH_3OH$ and 23 g/h of HCOOH left the reactor together with water vapour.

EXAMPLE 2

The same reaction conditions as in example 1 were used, but the leaving gases were condensed at 15° C. A flow of condensate containing 19.3 g/h of HCOOH and 4.1 g/h of $CH_3OH$ was taken out. The concentration of formic acid was 41 g/l. 71 percent of the condensate were brought back to the tank for dissolving chlorate from which the condensate was added to the chlorine dioxide reactor. The total degree of recirculation for the formic acid was 60 percent. By recirculation of the condensate the addition of methanol could be reduced to 25 g/h or, with 17 percent, at the same time as the production of formic acid decreased with 60 percent and the departing gas flow contained 202 g/h of $ClO_2$, 13 g/h of $CO_2$, 6.1 g/h of $CH_3OH$ and 9 g/h of HCOOH. The chlorine dioxide water from this example showed a higher stability than the one in example 1, depending on higher purity.

We claim:

1. A process for production of chlorine dioxide by reacting in a reaction vessel an alkali metal chlorate, a mineral acid and methanol as a reducing agent in proportions to generate chlorine dioxide in a reaction medium maintained at a temperature from about 50° C. to about 100° C. and at an acidity within the interval from about 2 to about 11N and subjected to a subatmospheric pressure sufficient to effect evaporation of water, whereby a mixture of chlorine dioxide, water vapor and gaseous by-products is withdrawn from an evaporation region in the reaction vessel and alkali metal sulfate is precipitated in a crystallization region in the reaction vessel, wherein formic acid is produced as one of said gaseous by-products at a rate dependent on the concentration of formic acid in said reaction medium, the process including the step of maintaining a concentration of formic acid in the reaction medium at a level higher than that resulting in the maximum rate of production of formic acid as a gaseous by-product.

2. A process according to claim 1, wherein the gaseous by-products are condensed to obtain formic acid and the content of formic acid in the reaction vessel is increased by recirculation of the condensate.

3. A process according to claim 2, wherein the condensation of the gaseous by-products is carried out at a temperature between 8° and 40° C. and at an absolute pressure of between 90 and 400 mm Hg.

4. A process according to claim 3, wherein the condensate mainly consists of formic acid, methanol and water.

5. A process according to claim 2, wherein the condensate is concentrated by membrane separation.

6. A process according to claim 2, wherein the condensate is concentrated by azeotropic distillation.

7. A process for production of chlorine dioxide by reacting in a reaction vessel an alkali metal chlorate, a mineral acid and methanol as a reducing agent in proportions to generate chlorine dioxide in a reaction medium maintained at a temperature from about 50° C. to about 100° C. and at an acidity within the interval from about 2 to 11 N and subjected to a subatmospheric pressure sufficient to effect evaporation of water, whereby a mixture of chlorine dioxide, water vapor and gaseous by-products is withdrawn from a evaporation region in the reaction vessel and alkali metal sulfate is precipitated in a crystallization region in the reaction vessel, wherein formic acid is added to the reaction vessel and is present in the reaction vessel at a concentration greater than about 0.3 M.

* * * * *

UNITED STATES PATENT AND TRADEMARK OFFICE
CERTIFICATE OF CORRECTION

PATENT NO. : 4,978,517

DATED : December 18, 1990

INVENTOR(S) : Maria NORELL et al

It is certified that error appears in the above-identified patent and that said Letters Patent is hereby corrected as shown below:

Col. 2, line 30, after "chlorine" and before "on", the following should be inserted: --dioxide bleaching in the pulp bleach plant will be a load--.

Signed and Sealed this

Third Day of August, 1993

Attest:

Michael K. Kirk

MICHAEL K. KIRK

Attesting Officer

*Acting Commissioner of Patents and Trademarks*